(12) United States Patent
Eriksson et al.

(10) Patent No.: US 6,894,886 B2
(45) Date of Patent: May 17, 2005

(54) POWER CAPACITOR

(75) Inventors: Esbjörn Eriksson, Rönninge (SE);
Birger Drugge, Västerås (SE); Tommy Holmgren, Ludvika (SE); Göran Frisk, Ludvika (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 10/169,725

(22) PCT Filed: Jan. 15, 2001

(86) PCT No.: PCT/SE01/00063

§ 371 (c)(1),
(2), (4) Date: Nov. 26, 2002

(87) PCT Pub. No.: WO01/54151

PCT Pub. Date: Jul. 26, 2001

(65) Prior Publication Data

US 2003/0142457 A1 Jul. 31, 2003

(30) Foreign Application Priority Data

Jan. 14, 2000 (SE) .............................................. 0000117

(51) Int. Cl.[7] .......................... H01G 4/32; H01G 4/005; H01G 2/20

(52) U.S. Cl. .................. 361/301.5; 361/303; 361/308.1; 361/311

(58) Field of Search ................................ 361/272–273, 361/328–330, 541, 522, 301.4, 301.5, 303, 306.1, 307, 308.1, 308.2, 309, 311, 323, 309.1

(56) References Cited

U.S. PATENT DOCUMENTS

| | | | | |
|---|---|---|---|---|
| 3,014,167 A | * | 12/1961 | Winter et al. | 361/329 |
| 3,891,901 A | * | 6/1975 | Booe et al. | 361/309 |
| 4,320,437 A | * | 3/1982 | Shaw et al. | 361/303 |
| 5,475,272 A | | 12/1995 | Gothelf | |
| 5,625,527 A | * | 4/1997 | Hatada | 361/273 |

FOREIGN PATENT DOCUMENTS

| | | | | |
|---|---|---|---|---|
| DE | 4214121 A1 | * | 11/1993 | H01G/1/02 |
| EP | 0190621 | | 8/1986 | |
| EP | 0416164 | | 3/1991 | |
| EP | 0702380 | | 3/1996 | |
| EP | 702380 B1 | * | 11/1998 | H01G/2/10 |
| GB | 2125219 A | * | 2/1984 | H01G/1/02 |
| JP | 272609 | * | 3/1990 | H01G/4/24 |

* cited by examiner

Primary Examiner—Eric Thomas
(74) Attorney, Agent, or Firm—Oblon, Spivak, McClelland, Maier & Neustadt, P.C.

(57) ABSTRACT

A power capacitor for high voltage and including at least one capacitor element that has improved electrical properties and that allows simple manufacture. Each capacitor element has a substantially circular-cylindrical shape. The inside of the container has a corresponding shape to closely surround each capacitor element. In addition, each capacitor element is oriented with the axial direction coinciding with the axial direction of the container. A capacitor bank includes a plurality of the power capacitors, and uses of one or more of the invented power capacitors can be used as a component in electrical installations.

28 Claims, 7 Drawing Sheets

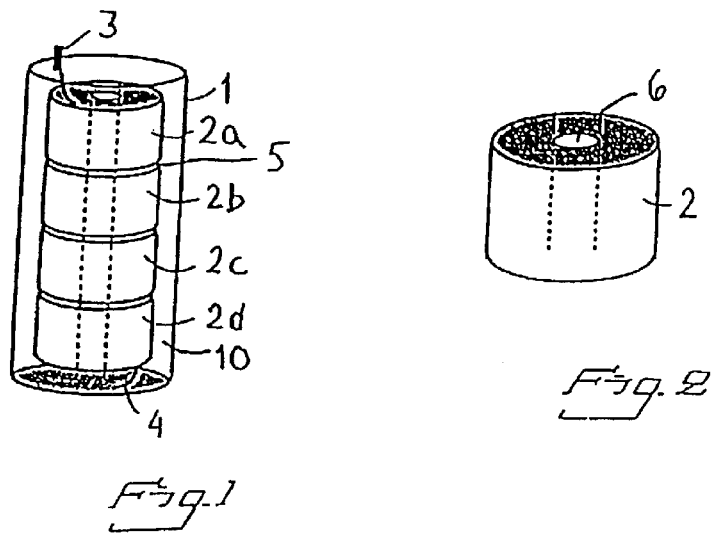
Fig. 1
Fig. 2
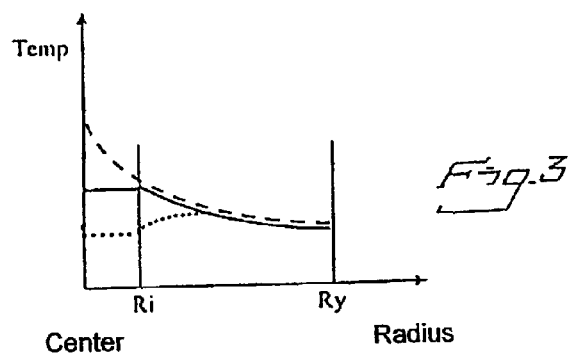
Fig. 3
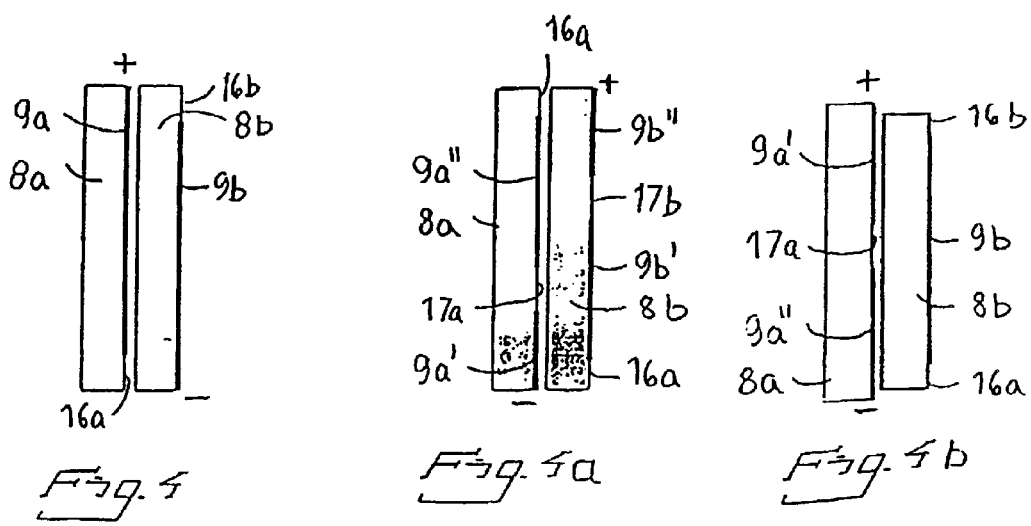
Fig. 4
Fig. 4a
Fig. 4b

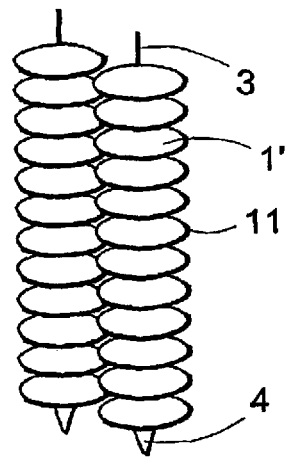
Fig. 7
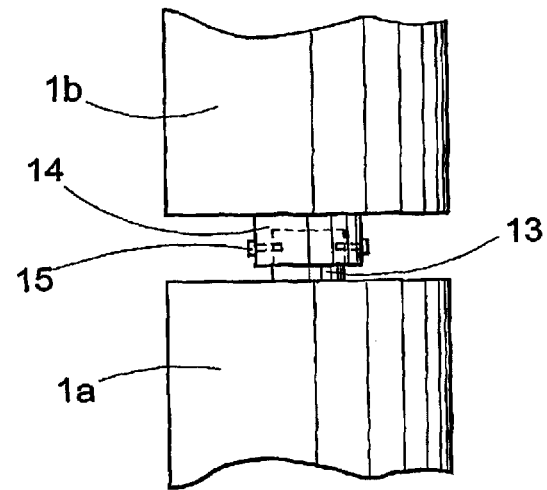
Fig. 8
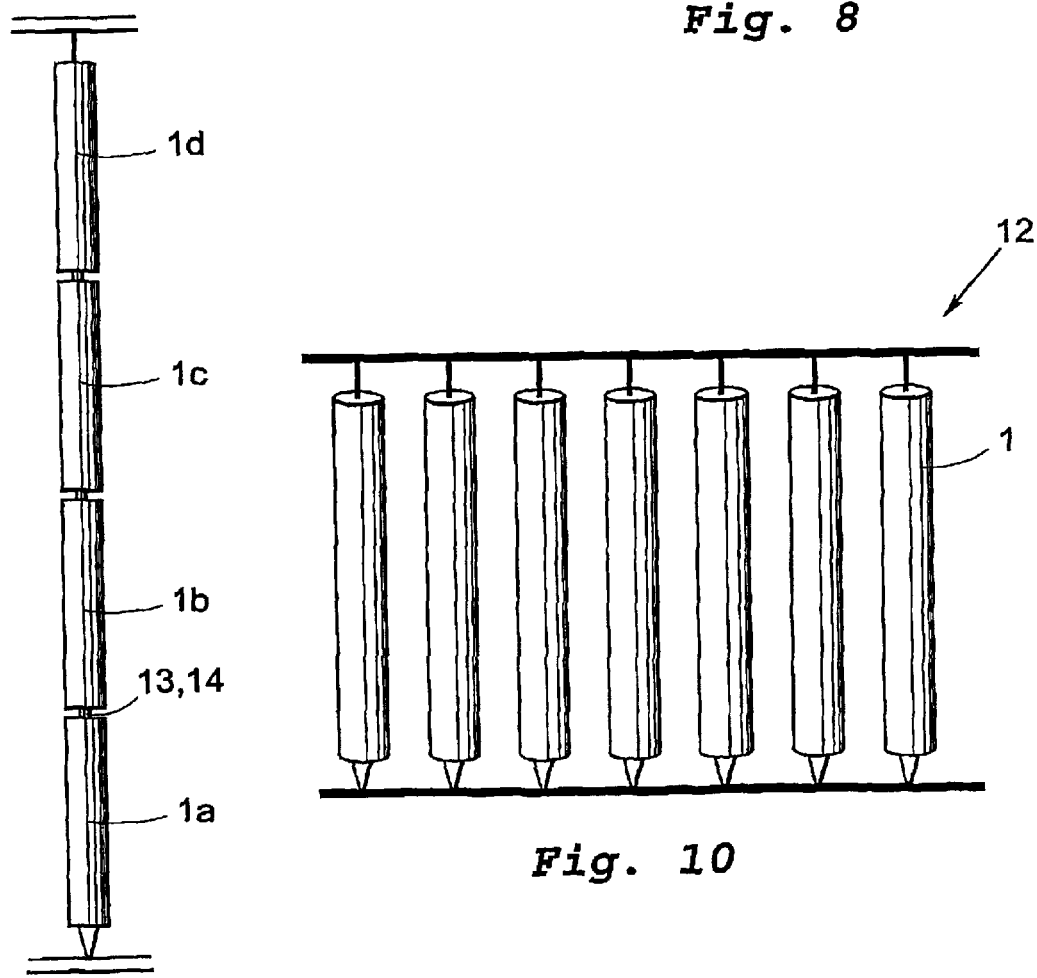
Fig. 9
Fig. 10

POWER CAPACITOR

BACKGROUND OF THE INVENTION

1. Field of the Invention

The present invention relates to a power capacitor primarily intended for a rated voltage in excess of 1 kV, .e.g. 5 kV, preferably at least 10 kV. The present invention also relates to a capacitor bank having a plurality of power capacitors.

2. Description of the Background Art

Power capacitors are important components in systems for transmission and distribution of electric power. Power capacitor installations are used primarily to increase power transmission capability through parallel and series compensation, for voltage stabilisation through static var-systems, and as filters for eliminating harmonics.

Capacitors have a phase angle that is close to 90° and therefore generates reactive power. By connecting a capacitor in the vicinity of the components that consume reactive, power, the desired reactive power can be generated there. Cables can thus be utilized to the full extent for transmitting active power. The consumption of reactive power by the load may vary and it is desirable to constantly generate a quantity of reactive power equivalent to the consumption. For this purpose a plurality of capacitors are connected via series and/or parallel connection in a capacitor bank. A requisite number of capacitors can be connected corresponding to the reactive power consumed. Compensating for the consumed power by utilizing capacitors in the manner described above is called phase compensation. A capacitor bank in the form of a shunt battery is arranged for this purpose in proximity of the components consuming reactive power. Such a shunt battery consists of a plurality of capacitors connected together. Each capacitor in its turn comprises a plurality of capacitor elements. The structure of such a conventional capacitor is explained below.

A shunt battery usually comprises a number of chains of a plurality of series-connected capacitors. The number of chains is determined by the number of phases, which is usually three. The first capacitor in a chain is thus connected to a cable for transmitting electric power to the consuming component. The cable for transmitting electric power is arranged a certain distance from the ground or from points in the surroundings having earth potential. This distance is dependent on the voltage in the cable. The capacitors are thus connected in series from the first capacitor, which is connected to the cable, and downwards. A second capacitor, arranged at an end of the chain of series-connected capacitors opposite to the first capacitor, is connected to earth potential or to a point in the electric system that has zero potential (e.g. unearthed 3-phase system).

The number of capacitors and their design are determined so that the permitted voltage (rated voltage) over the series-connected capacitors corresponds to the voltage in the cable. A plurality of capacitors is thus connected in series and arranged in stands or on platforms insulated from earth potential. Such a capacitor bank thus comprises a plurality of different components and demands relatively much material. Furthermore, a relatively robust construction is required if the stand/platform is to withstand external influence in the form of wind, earthquakes, etc. Considerable work is thus required to construct such a capacitor bank. This problem is particularly pronounced when the capacitor bank consists of a large number of capacitors. The capacitor bank also takes up a relatively large area on the ground.

Long cables for alternating voltage are inductive and consume reactive power. Capacitor banks for series-compensation are therefore arranged spaced along such a cable in order to generate the necessary reactive power. A plurality of capacitors is series-connected to compensate the inductive voltage drop. In a capacitor bank for series compensation, as opposed to a shunt battery, the series-connection of capacitors usually only takes up a part of the voltage in the cable. The chains of series-connected capacitors included in the capacitor bank for series-compensation are also arranged in series with the cable to be compensated.

A conventional capacitor bank comprises a plurality of capacitors. Such a capacitor in turn comprises a plurality of capacitor elements in the form of capacitor rolls. The capacitor rolls are flattened and stacked one on top of the other to form a stack 1 m tall, for instance. A very large number of dielectric films with intermediate metal layers will be arranged in parallel in the vertical direction of the stack. When a voltage applied over the stack increases, the stack will be compressed somewhat in vertical direction, due to Coulomb forces that act between the metal layers. For the same reason, if the voltage decreases the stack will expand somewhat in vertical direction. The stack formed has a specific mechanical resonance frequency or natural frequency, which is relatively low. The mechanical resonance frequency of the stack is amplified by specific frequencies of the current, which may produce a loud noise. The mains frequency constitutes such a frequency, which is defined by the fundamental frequency of the current and is usually 50 Hz. However, amplification of the mechanical resonance frequency can also be effected by harmonics in the current.

An example of a power capacitor of this known type is described in U.S. Pat. No. 5,475,272. A high-voltage capacitor constructed from a plurality of capacitor elements stacked one on top of the other and placed in a common container, is thus described here. The container is made of metal in conventional manner. The electrical lead-throughs are made of porcelain or polymer. The publication also describes various alternative couplings for connecting the capacitor elements in series or in parallel. Cylindrical capacitor containers are also known through EP Patent No. 0190 621, EP Patent No. 0 416 164 and EP Patent No. 0 702 380. None of these, however, relates to a power capacitor for high voltage.

One problem with a capacitor of known type, e.g. of the type described in U.S. Pat. No. 5,475,272 mentioned above, is that the capacitor elements included must be insulated from the container. The insulation must withstand voltage stresses considerably higher than the rated voltage of the capacitor. The aim is to fill the container with capacitor elements as efficiently as possible. Their external, flattened shape is unfavorable with regard to electric field amplification due to protruding foils, small radii, etc. They must also be connected together via internal connecting wiring in a manner that often creates further local irregularities in the electric field. This leads to considerable electric strength demands on the insulation against the container. If the capacitor is of a type that lacks fuses, short-circuiting between a capacitor element and the container may result in large amounts of energy being discharged at the defective point. The consequence may be an explosion with major damage.

Another problem with conventional power capacitors is the sound that is generated. The sound generation is strongest when the vibrations generated by the electrical voltage load coincide with the mechanical resonance frequency of the capacitor. The resonance frequency is proportional to the square root of the quotient between the rigidity of the capacitor package perpendicular to the electrode layers and inversely proportional to the extension of the package perpendicular to the electrode layers.

BRIEF SUMMARY OF THE INVENTION

The object of the present invention is to provide a power capacitor in which the problems described above have been solved. Accordingly, a power capacitor for high voltage is provided that includes at least one capacitor element enclosed in a container. Each capacitor element has a substantially circular-cylindrical shape and an inside of the container has a corresponding substantially circular-cylindrical shape to closely surround each capacitor element. Each capacitor element is also oriented with an axial direction coinciding with an axial direction of the container, the container being of electrically insulating material and provided with an electrical connection terminal arranged at each end of the container. The container itself constitutes insulation between the connection terminals.

"Substantially circular-cylindrical" indicates that the shape of the element may deviate to a limited extent from the circular-cylindrical. The shape may thus be slightly elliptical, e.g. with a difference in focal point radii of up to 10%, or have some other shape that deviates to a corresponding extent from purely circular. Capacitor elements with circular-cylindrical shape and connection points at each end, i.e. at the circular end surfaces, have considerably more favorable shape from an electrical point of view than the conventional flat elements described above.

Since the inside of the container has a circular-cylindrical shape corresponding to the cylindrical shape of the capacitor elements so as to closely surround the capacitor elements, a capacitor is obtained that is as compact as possible and suited to a shape for the elements that is advantageous from the manufacturing point of view and also electrically favorable. Unnecessary space between container and capacitor elements is also avoided.

Thanks to the orientation of the capacitor elements in relation to each other, a considerable reduction in sound generation is also achieved. The total dimension perpendicular to the electrode layers, i.e. the diameter, will be considerably less than the equivalent dimension in a conventional capacitor package. This increases the mechanical resonance frequency significantly. The risk of vibrations from the electric voltage load coinciding with the resonance frequency is thus practically eliminated. The need for sound-reducing or sound-absorbing measures is greatly reduced, thus entailing great savings in cost.

Since the container is made of electrically insulating material the need for insulation between capacitor elements and container is eliminated, and thus also the risk of discharge between capacitor elements and container. Furthermore, the electrical connections of the capacitor can be extremely simple and the creepage distance between them can be obtained from the container itself. Eliminating the insulation and lead-throughs also makes the capacitor relatively compact, thus offering the opportunity of building compact capacitor banks. It is thus possible to obtain a creepage distance at least corresponding to the length of the container. This constitutes an advantageous embodiment of the invention.

The container is suitably made of a polymer, preferably polyethylene. These types of materials combine good insulating ability with other desired qualities such as strength, manageability and cost. In preferred embodiments of the capacitor in accordance with the invention, the material is thus of the types mentioned.

In accordance with a second preferred embodiment, the invention comprises a plurality of capacitor elements connected in series and with the connection terminals of the capacitor arranged at both ends of the cylindrical container. No special arrangement is then necessary to obtain the require creepage distance between the terminals since the container itself creates this.

In accordance with yet another preferred embodiment of the invention, each connection terminal comprises an electric conductor secured in the material of the container, e.g. in the form of a foil. Such connection terminals are particularly simple and an advantageous opportunity is reliably exploited by the container material being insulating.

In accordance with another preferred embodiment the capacitor elements are arranged with a central, axial channel running through each capacitor element. This provides favorable cooling conditions for inner cooling of the capacitor. In a cylindrical volume with homogeneous heat generation, and with no opening in the center, the temperature profile in radial direction will increase strongly towards the center. If the cylindrical volume is arranged so that the heat generation does not occur in a cylindrical part volume in the center of the total volume, the maximum temperature in the center will be reduced. If, in addition, some form of forced cooling is arranged in the cylindrical part volume in the center, the maximum temperature will be further reduced. Arranging the part volume in the center as a through-running channel is an advantageous embodiment of the invention from a cost and volume aspect, whereas the external dimensions of the total capacitor increases relatively little in comparison with the dimensions of the central channel.

In accordance with yet another preferred embodiment of the invention, at least one capacitor element is divided into a plurality of sub-elements arranged concentrically in relation to each other, the outermost sub-element of radially adjacent sub-elements having a central channel running through it that is substantially circular-cylindrical in shape and closely surrounds the inner sub-element. In certain applications this may be a practical way of achieving a capacitor that optimally utilizes the space taken up. The sub-elements in a capacitor element are suitably connected in series. It is also preferred that the number of sub-elements is odd, which facilitates connecting them together.

In accordance with another preferred embodiment of the invention, each capacitor element is manufactured in a known manner using a rolled-up metal coated polymer film. This is compactly rolled so as to eliminate any space that would have to be filled with oil. If the metal coating is sufficiently thin, this technique with metallized film offers the chance of obtaining a "self-healing capacitor". This means that in the event of an electric discharge at one point on the film, the metal nearest the defective point will be vaporised by a strong, but brief, discharge current that will pass the short circuit. When the metal nearest the defect is vaporised the electric strength is regained in that area and the capacitor element has thus "self-healed". The advantages brought about by the metallized film technique are utilized in a particularly favorable manner in a capacitor in accordance with this embodiment of the invention, and further contribute to creating a compact, simple, reliable capacitor that is simple to manufacture. The increased rigidity perpendicular to the electrode layers increases in this embodiment, which increases the resonance frequency, thereby reducing sound generation.

In accordance with yet another preferred embodiment of the invention, the metal coating is produced in such a way that elements with inner series-connected part capacitors are formed. The technique is known as "elements with inner series-connection" and is known per se. The embodiment is obviously advantageous for capacitors for high voltage since the number of series connections of elements can be reduced. However, the embodiment is particularly advantageous in utilizing the above-mentioned technique for self-healing in power capacitors for high operating voltages. Since functioning self-healing requires particularly thin metal coating and the currents that flow through the metal generate active loss effect (heat), thinner layers mean higher losses. One way of reducing the losses without compromising on the requirement of a thin metal coating is to choose a shape for the metal-coated film, and thus a shape for the element, such that the dimension of the metal coating perpendicular to the rolling direction decreases and the length of the roll increases. If series-connection is not resorted to, the consequence will be that the cylindrical elements acquire relatively little height in relation to their diameter. Series-connecting many such elements, as required for high voltage, becomes disadvantageous from the cost aspect. With inner series connections. Thus, several series-connected part elements can automatically be built in a cylindrical element in accordance with this embodiment of the invention, with optimal relation between height and diameter from the manufacturing aspect, and with good self healing qualities.

In accordance with a further preferred embodiment the capacitor is dry, i.e. without oil. Advantage is thus taken of a capacitor in which the container is of insulating material, namely that the capacitor elements need not be surrounded by oil, as is normally necessary with conventional capacitors. The risk of fire and leakage is eliminated with an oil-free capacitor, which further contributes to achieving compact, material-saving equipment since the capacitors can be arranged closer to sensitive peripheral equipment than otherwise.

With the embodiment comprising a dry capacitor, it may be suitable to surround the capacitor elements with a gel. This constitutes yet another preferred embodiment of the invention.

In accordance with another preferred embodiment of the invention, the container is provided at least at one end with mechanical connection means for direct connection with a corresponding connection means in an adjacent power capacitor. Thanks to the container being made of insulating material the power capacitors can be fitted together without intermediate insulators and a stand is therefore superfluous. The management of the mechanical connection means utilises the advantages offered so that the capacitors can be connected directly together in a stack. This is particularly valuable when constructing a capacitor bank. Such a bank is then extremely compact and flexible.

In a particularly preferred embodiment the mechanical connection means comprises the electrical connection terminal of the power capacitor, whereby joining of the power capacitors is particularly simple and compact. The electrical connection terminal is thus formed as a mechanical connection point, e.g. a screw joint. Other equivalent joints such as bayonet joints, mechanical joints, rivet joints, welded joints, etc. may naturally be used.

In yet another embodiment the outside of the container is provided with protrusions, e.g. flanges, for extending the creepage distance if necessary.

In a preferred embodiment of the capacitor bank, the capacitors are insulated from each other exclusively by each capacitor container. "Exclusively" shall be interpreted here to mean that no additional special insulating material is arranged. Clearance is naturally not excluded. A bank built up in this way thus makes favorable use of advantages offered by the power capacitor in accordance with this embodiment of the invention and allows the capacitors in the bank to be joined together without intermediate insulators. The bank is thus extremely compact and flexible. Exploiting the possibility of the capacitors being stacked axially on top of each other to form a compact unit is particularly advantageous.

The use of the power capacitor in accordance with an embodiment of the invention in an electric plant entails utilizing the benefits of the power capacitor in the plant. Very compact components can thus be achieved, thereby greatly reducing the space required. The sound generation is also greatly reduced. Furthermore, the construction of the power capacitors facilitates their installation. The capacitors can simply be suspended in a stand arrangement. Their immunity to earthquakes and similar tough external influences is thus greatly increased. These benefits are particularly accentuated in certain specific contexts, which thus constitute preferred embodiments of the use in accordance with this embodiment of the invention.

Thus, the use of the power capacitors in accordance with an embodiment of the invention for transmitting active or reactive power to a direct current or an alternating current network constitutes a preferred embodiment. Generation of reactive power should be performed as close to the points of consumption as possible in order to avoid the reactive power having to be carried long distance via cables.

In this cases capacitors constitute a more flexible alternative than generation from a synchronous machine. The compact power capacitor in accordance with this embodiment of the invention increases flexibility and reduces the financial, practical and technical limitations as regards the desire for placing as close to the consumer as possible. With the power capacitor in accordance with this embodiment of the invention, therefore, even relatively small machines can be directly compensated without such a solution being uneconomical. Even with large capacitor banks for uneven loads, with automatic thyristor control, increased flexibility and compactness are obtained. The technical economical area where these can be used is thus expanded.

Another preferred use is as a coupling capacitor for transmitting high-frequency signals via electric power lines, e.g. carrier transmission of telephony. On the trunk line network carrier frequency connections normally occur on each section of a cable. It is important to obtain correlation between the cable protection at each end of the cable. Suitable frequencies lie within the long wave band (36–450 kHz). The lower frequencies are reserved for long cables since signal suppression increases with the frequency. In Sweden a two-phase connection to the cable is normally used, with the aid of a coupling capacitor or capacitor voltage transformer. Blocks are inserted in the main current circuit inside the coupling point, and these must withstand both the load current of the cable and short circuiting current. They shall block the frequency band used for the connections on the cable. Only one modulated side band is used for the connection. The carrier wave, as well as one side band, is suppressed. With a power capacitor in accordance with this embodiment of the invention the potential increases for utilizing the power-line network for telephony.

Yet another preferred use is utilizing the power capacitor in a capacitor voltage divided in a capacitor voltage transformer. With the compactness and simplicity obtained with the power capacitor in accordance with this embodiment of the invention, the area of application for using the capacitor for voltage transforming increases.

In accordance with another preferred use, one or more power capacitors in accordance with the invention is/are utilized as voltage-rigid static current changer/inverter. An important area of application for these is in high-voltage direct current transmission (HVDC). Such transmission has for a long time been used almost exclusively for transmitting extremely high power long distances. Recently, however, voltage-rigid inverters have come into use for HVDC. This, together with the used of metal oxide semiconductors instead of thyristor rectifiers, has lead to an increase in the economically reasonable area for HVDC transmission down to a single megawatt. Thanks to its favorable properties such as compactness, simplicity and low cost, a power capacitor in accordance with this embodiment of the invention contributes to further increasing the area of application for HVDC transmission and to it being a more competitive alternative than conventional alternating current transmission and local generation in remotely situated communities. This technique also opens new possibilities for improving voltage quality in the AC network. The reduced sound level with a capacitor in accordance with this embodiment of the invention is particularly significant in this application due to the existence of electrical harmonics.

In accordance with yet another preferred use the power capacitor is utilized in a current-rigid static current changer inverter. Important applications are as net-commutated current change for HVDC, motor operation which is often six pulse-based and electrolysis rectifier where two six-pulse rectifiers are often connected in parallel. In this context the compactness, flexibility, endurance and low sound level of the power capacitor are of great significance.

Yet another preferred embodiment of the invention constitutes the use of the power capacitor in a capacitor bank in an AC filter or in a DC filter. In such an application it is imperative to have series-connected capacitors. It is often desirable to have large installed capacitor effect for good manufacturing quality. Thanks to its compact construction and suitability for series-connection, the described power capacitor is particularly well suited for use in such filtering. It also permits great flexibility for optimal tuning. In a preferred embodiment of the use in a filter the filter is tuned. In such an application the advantages mentioned above are of particular interest.

Another preferred embodiment of the use of the power capacitor in accordance with an embodiment of the invention is as series capacitor in a series-compensated capacitor plant This, too, is an application in which the qualities of the power capacitor in accordance with an embodiment of the invention are particularly advantageous.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows in principle the design of a capacitor in accordance with an embodiment of the invention;

FIG. 2 shows an individual capacitor element comprising metal-coated polymer films tightly rolled to a roll in accordance with an embodiment of the invention;

FIG. 3 illustrates a graph of the heat development in a capacitor in accordance with an embodiment of the invention;

FIG. 4 shows an enlarged radial part section through the capacitor element of FIG. 2 in accordance with an embodiment of the invention;

FIG. 4a shows an alternative embodiment of FIG. 4;

FIG. 4b shows an alternative embodiment of FIG. 4;

FIG. 7 shows an alternative embodiment in which the container is provided externally with grooves constituting protrusions that extend a creepage current;

FIG. 8 shows the upper end of the container for a capacitor in accordance with an embodiment of the invention;

FIG. 9 shows a stack of capacitors combined in accordance with an embodiment of the invention;

FIG. 10 illustrates a plurality of capacitors with cylindrical containers combined: in accordance with an embodiment of the invention;

DETAILED DESCRIPTION OF THE DRAWINGS

Figure 5:
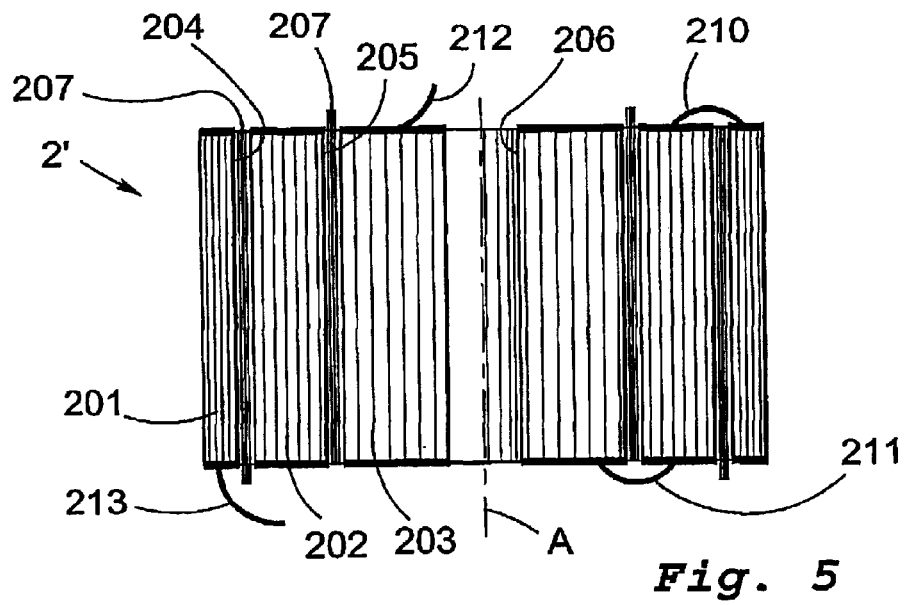
FIG. 5 shows a longitudinal section of an alternative embodiment of a capacitor element.

Referring now to the drawings, wherein like reference numerals designate identical or corresponding parts throughout the several views.

FIG. 1 shows in principle the design of a capacitor in accordance with the invention. It consists of an outer container 1 of polyethylene which encloses, in this case, four capacitor elements 2a–2d. The container 1, like the capacitor elements 2a–2d, is circular-cylindrical. The capacitor elements 2a–2d are connected in series. Connection terminals 3, 4 are arranged at each end of the capacitor. Each terminal consists of a conducting foil mounted in the material of the container and extending therethrough. A gel 10 is arranged between the capacitor elements 2a–2d and the container. The gel serves as electrical insulation and thermal conductor.

FIG. 2 shows an individual capacitor element comprising metal-coated polymer films tightly rolled to a roll. The capacitor element 2 has an axially running hole 6 running; centrally through it, which may be used for cooling the element. Typical dimensions for such a capacitor element are a diameter of 100–300 mm, a hole diameter of 20–90 mm, preferably at least 30 mm, and a height of 50800 mm. Such a capacitor element is intended for a voltage of about 1–15 kV. A capacitor element with a diameter of 200 mm, a hole diameter of 60 mm and a height of 150 mm, for instance, is intended for a voltage of about 4–10 kV. Up to 40 kV is thus obtained with four of these connected in series, as shown in FIG. 1, and 80 kV is obtained with eight capacitor elements, etc.

Thermal losses arise in the capacitor element 2, resulting in internal heating of the element. The maximum temperature is critical for the electrical dimensioning. Higher temperature forces lower stress, which leads to lower output per volume unit, i.e. it has considerable influence on the consumption of material and the cost. In a cylindrical volume with homogenous heat generation, and with no opening at the center, the temperature profile in radial direction will acquire an asymptotic appearance as indicated by the broken curve in FIG. 3. If the capacitor element is provided with a central opening 6 with radius Ri, the temperature profile will follow the unbroken curve in FIG. 3. Forced cooling is also possible if necessary. The temperature profile obtained will then be as indicated by the dotted line in FIG. 3. The central opening 6 in each capacitor element 2 may also be utilized to centrally align the capacitor elements. In this case the capacitor elements are threaded onto a centering tube that runs through all the capacitor elements.

FIG. 4 shows an enlarged radial part section through the capacitor element in FIG. 2. The part section shows two adjacent turns of the metal-coated film. The film 8a and 8b, respectively, is approximately 10 lam in thickness and the material is polypropylene. The metal layer 9a, 9b is approximately 10 nm thick and consists of aluminium or zinc or a mixture thereof, which has been vaporised onto the polypropylene film prior to rolling. With such a metallized film an electric stress E in the order of 250 V/$\mu$m can be reached. The technique of manufacturing a capacitor element in this way is already known and a more detailed description is therefore superfluous. Alternatively, the capacitor elements can be built up using film foil technology where propylene film and aluminium foil are rolled up together. However, the use of metallized film has the advantage of self-healing and allows higher electrical stress and higher energy density than with the film foil technology.

The metal layer covers the plastic film from one side edge up to a short distance from its other side edge. A random area 16a of the film 8a thus lacks metal-coating. In similar manner a random area 16b of the film 8b lacks metal coating. The exposed random area 16b of the film 8b, however, is at the opposite end edge from that on the film 8a. Electrical connection for the layer 9a is obtained at the upper end of the element, seen in the drawing, and at the lower end of the layer 9b so that a plus electrode is obtained in one direction and a minus electrode in the other. To ensure efficient electrical contact the end portions may be sprayed with zinc.

In the modified embodiment shown in FIG. 4a the capacitor element has inner series-connection. Here the metal layer 9a, 9b on each plastic film 8a, 8b is divided into two portions 9a', 9a" and 9b', 9b", respectively, separated by an uncoated part 17a, 17b, respectively. It is also possible to divide the metal layers into more than two portions. Each pair of metal-layer portions, e.g. 9a' and 9b', forms a part capacitor element which is connected in series.

FIG. 4b shows a variant of the modified embodiment, where the metal layer 9a on only the one plastic film 8a is divided into two parts 9a', 9a" separated by an uncoated part 17a, whereas the metal layer 9b on the other plastic film 8b is undivided. Each of the parts 9a' and 9a" extends right out to the edge of the film 8b so that the electrical connection in this case occurs to the same film 8b. The metal layer 9b on the other plastic film terminates on both sides a short distance 16a, 16b from the edge of the film and is thus not electrically connected in any direction.

FIG. 5 shows a longitudinal section of an alternative embodiment of a capacitor element 2' in accordance with an embodiment of the invention. The capacitor element is divided into three sub-elements 201, 202, 203 which are concentric with the common axis designated A. The outermost sub-element 201 is substantially tubular, with an inner side 204 surrounding the intermediate sub-element 202 with a small space. The intermediate sub-element similarly has an inner side 205 that closely surrounds the innermost sub-element 203. The innermost sub-element 203 has a central channel 206 running through it. The three sub-elements have different radial thickness, the outermost having the smallest thickness. The sub-elements thus have substantially the same capacitance. Insulation 207 is arranged between the sub-elements.

The sub-elements are connected in series. Two radially adjacent sub-elements have one of their coupling points at the same end. The outermost sub-element 201 is thus connected by the coupling member 210 to the intermediate sub-element 202 at one end of the capacitor element 2', and the intermediate sub-element 202 is connected by the coupling member 211 to the innermost sub-element 203 at the other end of the capacitor element 2'. This means that the connections 212, 213 for the capacitor element 2' are located at opposite ends thereof. If the number of sub-elements is greater than three, e.g. five or seven, connection of the coupling points at the ends of the sub-elements is continued alternately in the same way.

Figure 6:
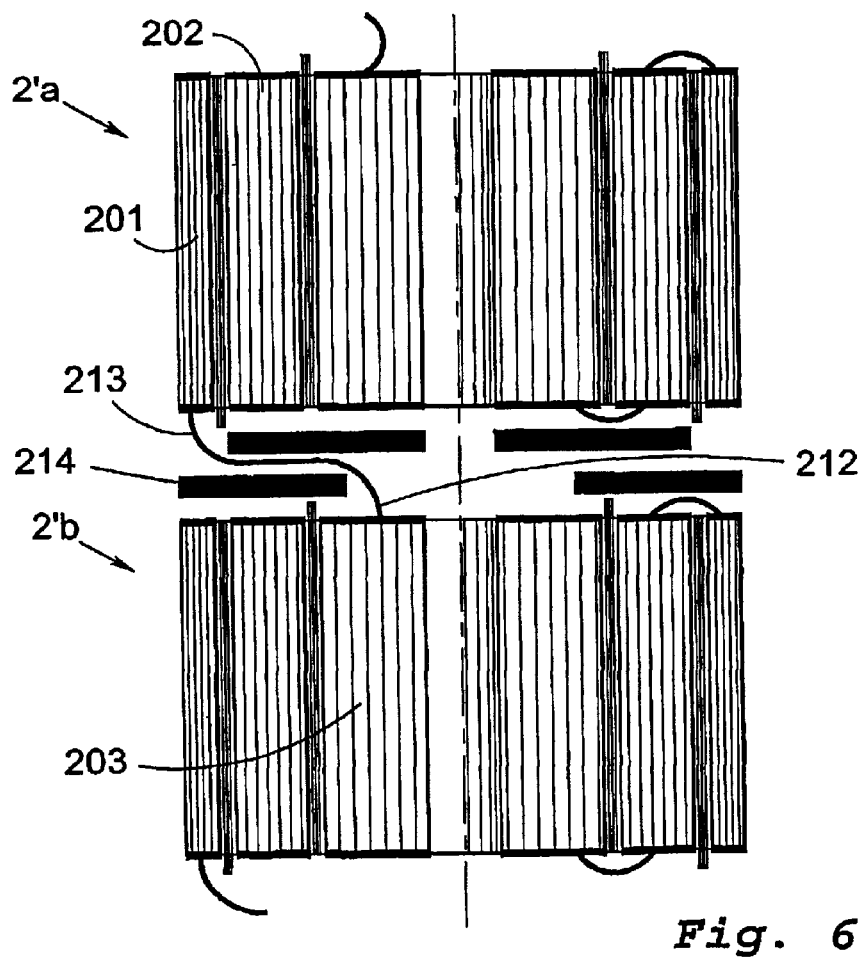
FIG. 6 illustrates a plurality of capacitor elements of the type shown in FIG. 5 connected in series, in accordance with an embodiment of the invention.

FIG. 6 illustrates how a plurality of capacitor elements of the type shown in FIG. 5 can be connected together in series. The figure shows two such capacitor elements 2'a, 2'b. The connection 212 of the lower capacitor element 2b at the upper end of the inner sub-element 203 is coupled to the connection 213 of the upper capacitor element 2'a at the lower end of the outermost sub-element 201. Insulation 214 is arranged between the capacitor elements in order to deal with the potential differences occurring in this type of capacitor element. FIG. 7 shows an alternative embodiment in which the container 1' is provided externally with grooves 11 constituting protrusions that extend the creepage current.

FIG. 8 shows the upper end of the container 1a for a capacitor in accordance with an embodiment of the invention. This is connected to the lower part of an identical capacitor 1b by means of mechanical connection means 13 and a supplementary connection means 14 on the upper capacitor. The connection means 13 and 14 are of metal and electrically connected to respective electric connection terminals 3, 4 (see FIG. 1). The connection means are dimensioned to enable a stack of capacitors to be built up in a stable manner, without the need for any other stand elements. The two connection means are secured to each other by means of a number of screws 15. FIG. 9 shows how a stack of capacitors 1a–1d can thus be combined.

FIG. 10 illustrates how a plurality of capacitors with cylindrical containers 1 are combined in accordance with an embodiment of the invention to form a capacitor bank 12. Similarly, a plurality of stacks of capacitors as shown in FIG. 9 may be combined. The bank may also comprise a plurality of such rows of capacitors.

Figure 11:
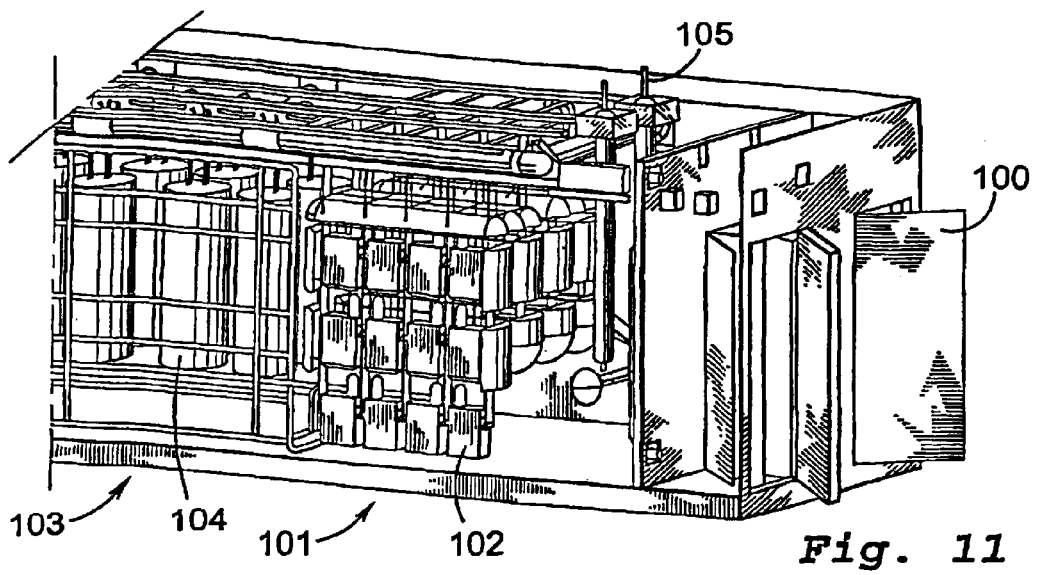
FIG. 11 illustrates a plant with a conventional capacitor bank.
Figure 12:
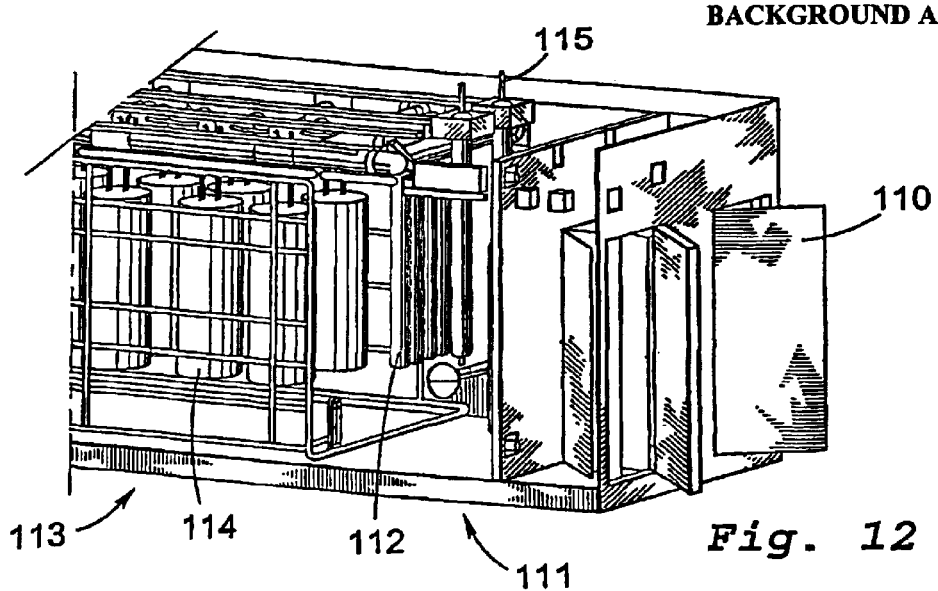
FIG. 12 illustrates a plant with a capacitor bank in accordance with an embodiment of the invention.

FIGS. 11 and 12 illustrate a comparison between a plant with a conventional capacitor bank, and a similar plant with a capacitor bank in accordance with an embodiment of the invention. The conventional design is illustrated in FIG. 11 where a container-like building 100 contains a capacitor bank constructed from conventional power capacitors 102, rectifier stacks 103 with thyristors 104 and with cable bushings 105.

The equivalent plant provided with a capacitor bank 111 with power capacitors 112 in accordance with an embodiment of the invention is illustrated in FIG. 12. In other respects the rectifier stacks 113 with thyristors 114, as well as the cable bushings 115, are manufactured in the same way as in the plant shown in FIG. 11. The power capacitor 112 is in the form of elongated tubular cylinders suspended from a stand part in the building 110. As can be seen from the drawings, the space required for the capacitor bank 111 is considerably less than for the capacitor bank 101 of conventional type. The building can therefore be made several meters shorter for a plant in accordance with this embodiment of the invention. The plant illustrated is for a 150 kV application.

Figure 13:
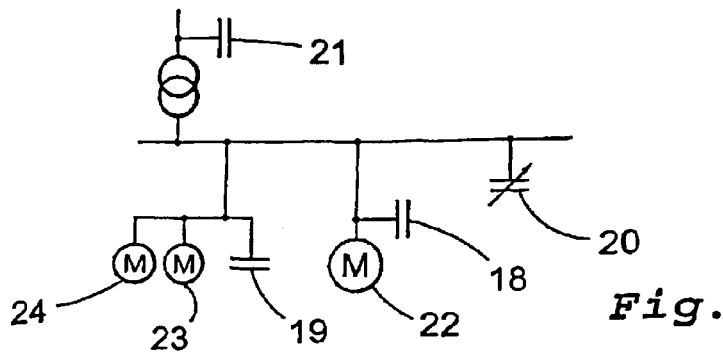
FIG. 13 shows a network to a consumer station, provided with capacitor banks for generating reactive power at various levels in the network, in accordance with an embodiment of the invention.

FIG. 13 shows a network to a consumer station, provided with capacitor banks for generating reactive power at various levels in the network. Each capacitor bank is built up on the principles shown in FIGS. 1–8. The bank 18 is arranged for direct compensation of an individual object, in this case a motor 22. The bank 19 is arranged for group compensation and thus generates reactive power for several loads—the motors 23 and 24. This may be suitable when several small machines have a common feed-out point and uniform operation. 20 designates a capacitor bank with automatic control with thyristors. The automatic system connects and disconnects several parallel capacitors in steps in accordance with the varying demand for reactive power. A power capacitor in accordance with an embodiment of the invention is also used on the high-voltage side of the network. Such a power capacitor is illustrated at 21 in the figure.

Figure 14:
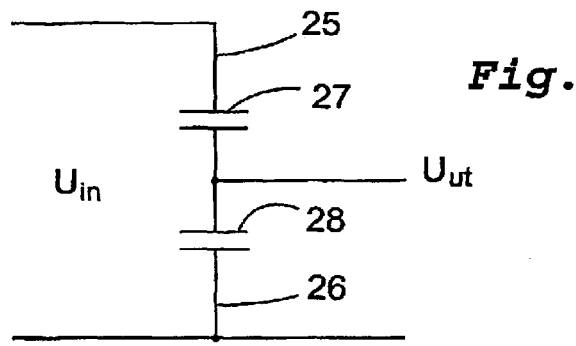
FIG. 14 shows the principle for transforming voltage with the aid of capacitors in a capacitor voltage transformer, in accordance with an embodiment of the invention.

FIG. 14 shows the principle for transforming voltage with the aid of capacitors in a capacitor voltage transformer. A capacitor bank 27, 28 with power capacitors in accordance with an embodiment of the invention is arranged in each branch 25, 26 so that they function as voltage dividers. A voltage $U_{out}$ is obtained on the outgoing line, its relation to the incoming voltage $U_{in}$ being as shown in the equation:

$$U_{out} = \frac{1 \times U_{in}}{1 + \frac{C_{28}}{C_{27}}}$$

Figure 15:
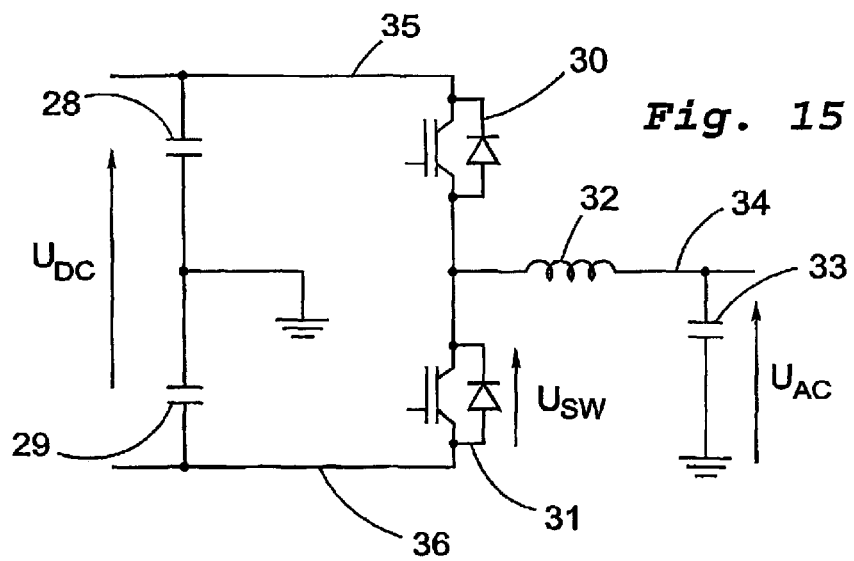
FIG. 15 illustrates the principle of how the power capacitor is used in a voltage-rigid static current changer inverter, in accordance with an embodiment of the invention.

FIG. 15 illustrates the principle of how the power capacitor in accordance with the invention is used in a voltage-rigid static current changer inverter. The figure shows one phase of such an inverter with PWM (Pulse Width Modulation) technology application. The alternative voltage, $U_{AC}$, is produced through high-frequency change-over between two fixed voltages, $U_{DC}$ and $U_{SW}$. The two DC capacitors 28, 29 of the circuit are composed of one or more power capacitors in accordance with this embodiment of the invention. Each branch 35, 36 is connected via its IGBT (Insulated Gate Bipolar Transistor) 30, 31 to the AC cable 34, to which a filter 33 is connected. An IGBT comprises a metal oxide semiconductor which requires a minimum of driving power.

Figure 16:
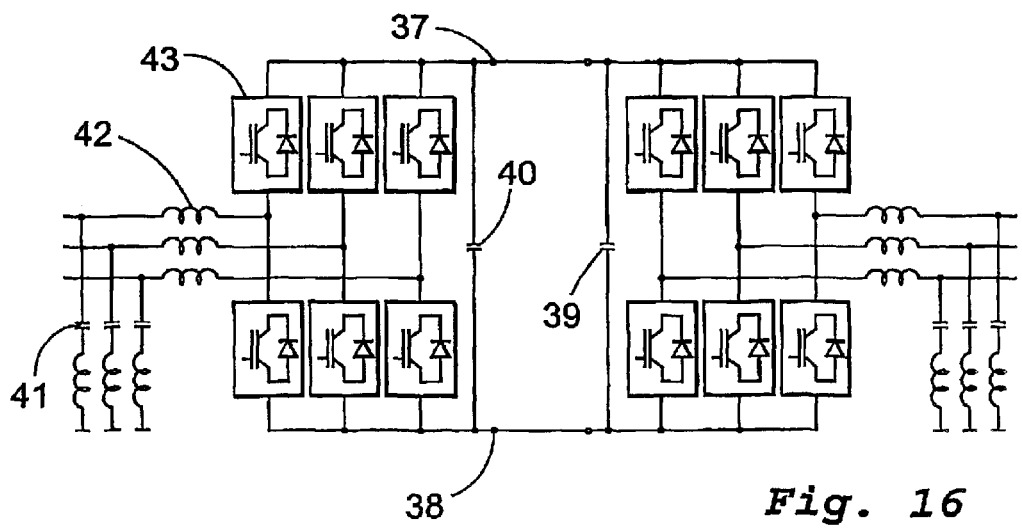
FIG. 16 illustrates an example the embodiment shown in FIG. 15, in which the main components in a transmission link are shown.

FIG. 16 illustrates an example of application of the technology in FIG. 15, the main components in a transmission link of this kind being shown. The cable connection is arranged at points 37, 38 and the two DC capacitors, designated 39, 40, are provided with power capacitors in accordance with an embodiment of the invention. Other vital components are the filters 41, static current converter reactors 42 and static current converter rectifiers 43.

Figure 17:
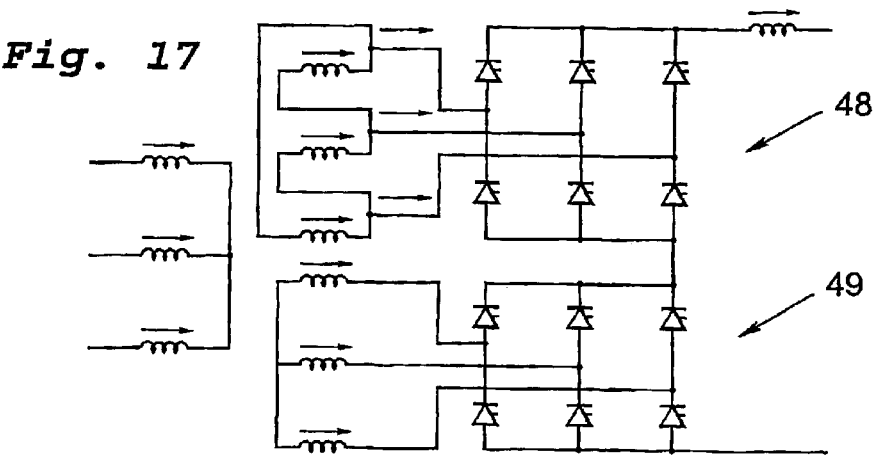
FIG. 17 shows a bridge with the transformer windings for a current-rigid rectifier having two six-pulse groups, in which the alternating voltages have been displaced with a Y/D coupling, in accordance with an embodiment of the invention.

FIG. 17 shows a bridge with the transformer windings for a current-rigid rectifier having two six-pulse groups 48, 49, where the alternating voltages have been displaced 30° with a Y/D coupling. The inductors are sufficiently large to keep the current substantially constant, i.e. current-rigid. The direct current is connected between the various phases.

Figure 18:
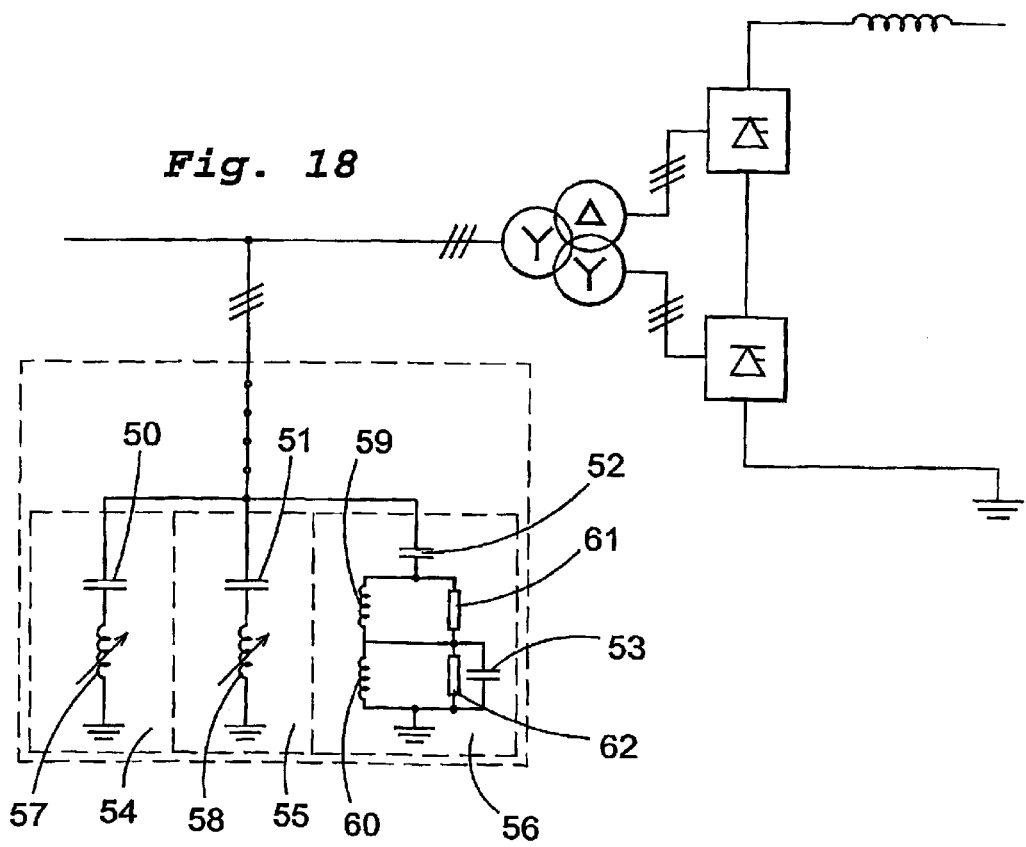
FIG. 18 illustrates the current rigid rectifier shown FIG. 17.

FIG. 18 shows how the current rigid rectifier in FIG. 17 is provided with filter equipment with power capacitors 50–53 in accordance with an embodiment of the invention. In filters 54 and 55 the power capacitors are tuned with tuneable reactors 57, 58 to series resonance circuits. Filter 56 is double-tuned and comprises reactors 59, 60 and resistors 61, 62. The filter equipment filters off harmonics. These are circulaced within the static current changer station both on the alternating voltage side and the direct voltage side. The figure shows only the AC filter, however. The power capacitors in the filter also generate reactive power, which compensates the reactive power consumption that the static current changer introduces, by delaying the current.

Figure 19:
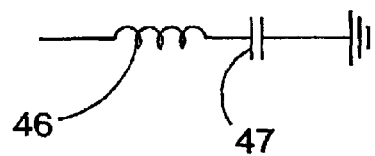
FIG. 19 illustrates schematically the construction of a tuned filter with a reactor and a capacitor bank, in accordance with an embodiment of the invention.

FIG. 19 illustrates schematically the construction of a tuned filter with a reactor 46 and a capacitor bank 47. The capacitor bank is built up of series-connected power capacitors of the type described in the present patent application. The reactor 46 and the capacitor bank in the example are tuned so that the resonance frequency between them, i.e. the tuning frequency of the compensating circuit, is just below the fifth harmonic.

Figure 20:
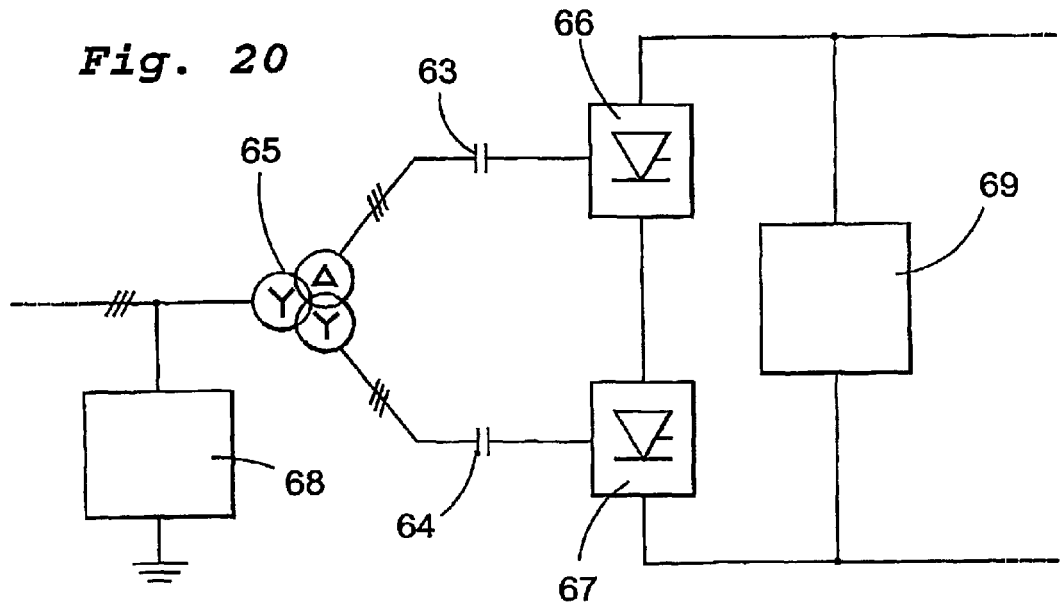
FIG. 20 illustrates a static current changer provided with a series compensated capacitor construction, in accordance with an embodiment of the invention.

FIG. 20 illustrates a static current changer provided with a series compensated capacitor construction (ccc). Each power capacitor bank 63, 64 is series-connected in the commutating circuit between the transformer 65 and the rectifiers 66, 67. Due to the inductance of the transformer the current will not be altered instantaneously, but over a certain period of time. The series-capacitor turns the voltage, thus compensating the reactive power. The plant is also provided with AC filter 68 and DC filter 69.

The electric power plants described above are only examples of applications in which the power capacitor may be utilized in accordance with an embodiment of the invention. It should be understood that the invention is not limited to the examples described.

What is claimed is:

1. A power capacitor for high voltage comprising:
   at least one capacitor element enclosed in a container,
      wherein each capacitor element has a substantially circular-cylindrical shape and an inside of the container has a corresponding substantially circular-cylindrical shape to closely surround each capacitor element,
      wherein each capacitor element is oriented with an axial direction coinciding with an axial direction of the container, the container being of electrically insulating material and provided with an electrical connection terminal arranged at each end of the container, whereby the container itself constitutes insulation between the connection terminals, wherein each capacitor element has a central channel running through it in an axial, direction, the through-running channels of the capacitor elements together forming a through-running channel between the two ends of the container, wherein the at least one capacitor element comprises at least two elongate ribbons of metal-coated polymer film placed one on ton of another and rolled up together in a longitudinal direction, with a least possible gap between turns of the film, and wherein the metal ribbons constitute electrodes of the at least one capacitor element, wherein said elongate ribbons are formed so that the metal-coated polymer films are arranged in several elongate areas with non-coated areas between them, a location and width of metal-coated areas varying alternately on two adjacent ribbons so that series-connected part capacitors are formed within the at least one capacitor element, and wherein at least three series-connected part capacitors are formed within each capacitor element.

2. A power capacitor as claimed in claim 1, wherein the container is made of a polymer.

3. A power capacitor as claimed in claim 2, wherein the polymer is polyethylene.

4. A power capacitor as claimed in claim 1, wherein a creepage distance between the connection terminals is at least equal to a length of the container.

5. A power capacitor as claimed in claim 1, wherein each connection terminal comprises an electric conductor secure in the electrically insulating material of the container and extending from an inside to an outside of the container.

6. A power capacitor as claimed in claim 1, wherein said through-running channel has a diameter greater than 30 mm.

7. A power capacitor as claimed in claim 1, wherein the at least one capacitor element comprises a plurality of sub-elements arranged concentrically in relation to each other, one outermost sub-element of radially adjacent sub-application elements having a central channel running through it that is substantially circular-cylindrical in shape and closely surrounds an inner sub-element.

8. A power capacitor as claimed in claim 7, wherein a number of the sub-elements in the at least one capacitor element is odd and the sub-elements are connected in series with each other.

9. A power capacitor as claimed in claim 1, wherein the polymer film is of polypropylene and the metal is at least one of aluminum and zinc.

10. A power capacitor as claimed in claim 9, wherein a thickness of the polymer film is 1–15 $\mu$m, a thickness of the metal is 2–20 nm, and the metal is applied by vaporization.

11. A power capacitor as claimed in claim 1, wherein the capacitor is a dry capacitor.

12. A power capacitor as claimed in claim 1, further comprising a gel surrounding the at least one capacitor element and arranged in the container.

13. A power capacitor as claimed in claim 1, wherein the container is provided at one end with a mechanical connection configured for direct connection with a corresponding connection in an adjacent power capacitor.

14. A power capacitor as claimed in claim 13, wherein the mechanical connection is configured as an electrical connection terminal.

15. A power capacitor as claimed in claim 1, wherein an outside of the container is provided with protrusions for extending creeping current.

16. A capacitor bank comprising a plurality of power capacitors as defined in claim 1.

17. A capacitor bank as claimed in claim 16, wherein the plurality of power capacitors are electrically insulated from each other exclusively by each capacitor container.

18. A capacitor bank as claimed in claim 16, wherein the plurality of power capacitors of the capacitor bank are arranged axially in line with each other to form a capacitor stack.

19. A capacitor bank as claimed in claim 18, wherein the power capacitors in the stack are mechanically connected by electrical connection terminals arranged at the end of each container.

20. The use of one or more power capacitors as claimed in claim 1 as components in an electric plant.

21. The use of one or more power capacitors as claimed in claim 1 for transmitting active or reactive power to a direct current or an alternating current network.

22. The use of one or more power capacitors as claimed in claim 1 in a coupling capacitor for transmitting high-frequency signals by electric power lines.

23. The use of one or more power capacitors as claimed in claim 1 in a capacitor voltage divider in a capacitor voltage transformer.

24. The use of one or more power capacitors as claimed in claim 1 in a voltage-rigid static current changer/inverter.

25. The use of one or more power capacitors as claimed in claim 1 in a current-rigid static current changer/inverter.

26. The use of one or more power capacitors as claimed in claim 1 in a capacitor bank in an AC filter or in a DC filter.

27. The use of one or more power capacitors as claimed in claim 26, wherein the AC or DC filter is tuned.

28. The use of one or more power capacitors as claimed in claim 1 in series-compensated capacitor plant.

* * * * *